United States Patent [19]
Huen et al.

[11] Patent Number: 5,686,813
[45] Date of Patent: Nov. 11, 1997

[54] MOBILE PHONE BATTERY PACK WITH A POWER-SAVING FUNCTION

[75] Inventors: Raico Hing Wah Huen; Shu Kai Lee, both of Kowloon, Hong Kong

[73] Assignee: Houston Audio Manufacturing Company Limited, Hong Kong, Hong Kong

[21] Appl. No.: 655,382

[22] Filed: May 30, 1996

[51] Int. Cl.[6] .................................................. H01M 10/46
[52] U.S. Cl. .................................. 320/5; 320/14; 320/39
[58] Field of Search ............................... 320/5, 8, 9, 12, 320/13, 14, 30, 39, 56; 307/19, 20; 429/9, 61

[56] References Cited

U.S. PATENT DOCUMENTS

| | | | |
|---|---|---|---|
| 4,894,765 | 1/1990 | Kähkipuro | 307/20 |
| 5,439,756 | 8/1995 | Anani et al. | 429/9 |
| 5,568,038 | 10/1996 | Tatsumi | 320/14 |

*Primary Examiner*—Edward Tso
*Attorney, Agent, or Firm*—Browning Bushman

[57] ABSTRACT

A mobile phone battery pack has a body housing a plurality of rechargeable battery cells and an energy storage device for electrical connection to said mobile phone. A switch connects the energy storage device to the battery cells. A microprocessor-based controller periodically closes the switch to enable charging of the energy storage device by the battery cells and opens the switch to disconnect the battery cells and to enable discharging of the energy storage device to power the mobile phone in a standby mode.

12 Claims, 2 Drawing Sheets

MOBILE PHONE BATTERY PACK WITH A POWER-SAVING FUNCTION

The present invention relates to a rechargeable battery pack for mobile phones, said battery pack having a prolonged operating time per recharging.

SUMMARY OF THE INVENTION

According to the invention, there is provided a battery pack for a mobile phone, which battery pack comprises a body, a plurality of rechargeable battery cells and an energy storage device provided within the body for electrical connection to said mobile phone, a switch connecting the energy storage device to the battery cells, and a microprocessor-based controller for operating the switch in a first state to enable charging of the energy storage device by the battery cells and in a second state to enable discharging of the energy storage device to power said mobile phone.

Preferably, the switch is closed in the first state and open in the second state.

It is preferred that the controller is adapted to operate the switch alternately between the first and second states.

Preferably, the switch in the second state is arranged to disconnect the battery cells from said mobile phone.

In a preferred embodiment, a sensor is provided for the controller to monitor the charging condition of the energy storage device and, in response, to maintain the charging condition of the energy storage device by operating the switch relatively longer or more frequently in the first state than in the second state.

Preferably, the battery cells are arranged to be connected to said mobile phone by a first path comprising the switch and by a second path comprising a second switch which is also to be operated by the controller.

More preferably, the energy storage device is arranged to be connected to said mobile phone via a uni-directional element which forms part of the first path.

It is preferred that the first path is provided for the battery cells to supply power to the energy storage device and said mobile phone for operation in a standby mode, and the second path is provided for the battery cells to supply power to only said mobile phone for operation in a busy mode.

The energy storage device may be provided by a capacitor or a rechargeable battery cell.

In a preferred embodiment, the battery pack includes a voltage step-up device connected to the battery cells for, under the control of the controller, stepping up the voltage of the battery cells supplied to said mobile phone.

Preferably, the voltage step-up device includes a step-up transformer for stepping up the voltage of the battery cells supplied to said mobile phone.

Preferably, the voltage step-up device includes a capacitor for smoothing the stepped-up voltage.

Preferably, the voltage step-up device includes a transistor which is to be switched on and off by the controller to extract power from the battery cells.

The invention will now be more particularly described, by way of example only, with reference to the accompanying drawings.

DETAILED DESCRIPTION OF PREFERRED EMBODIMENT(S)

Figure 1:
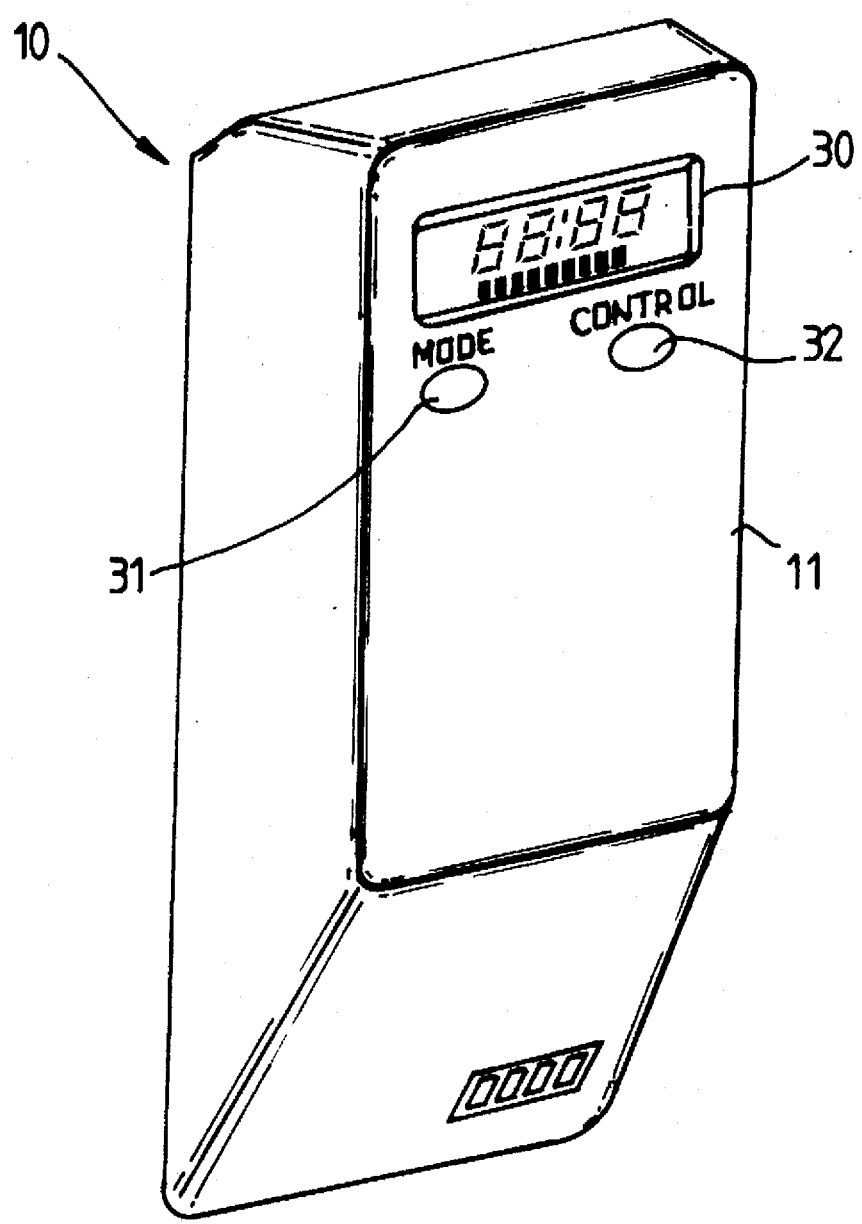
FIG. 1 is a perspective view of an embodiment of a battery pack, for use on a mobile phone, in accordance with the invention.
Figure 2:
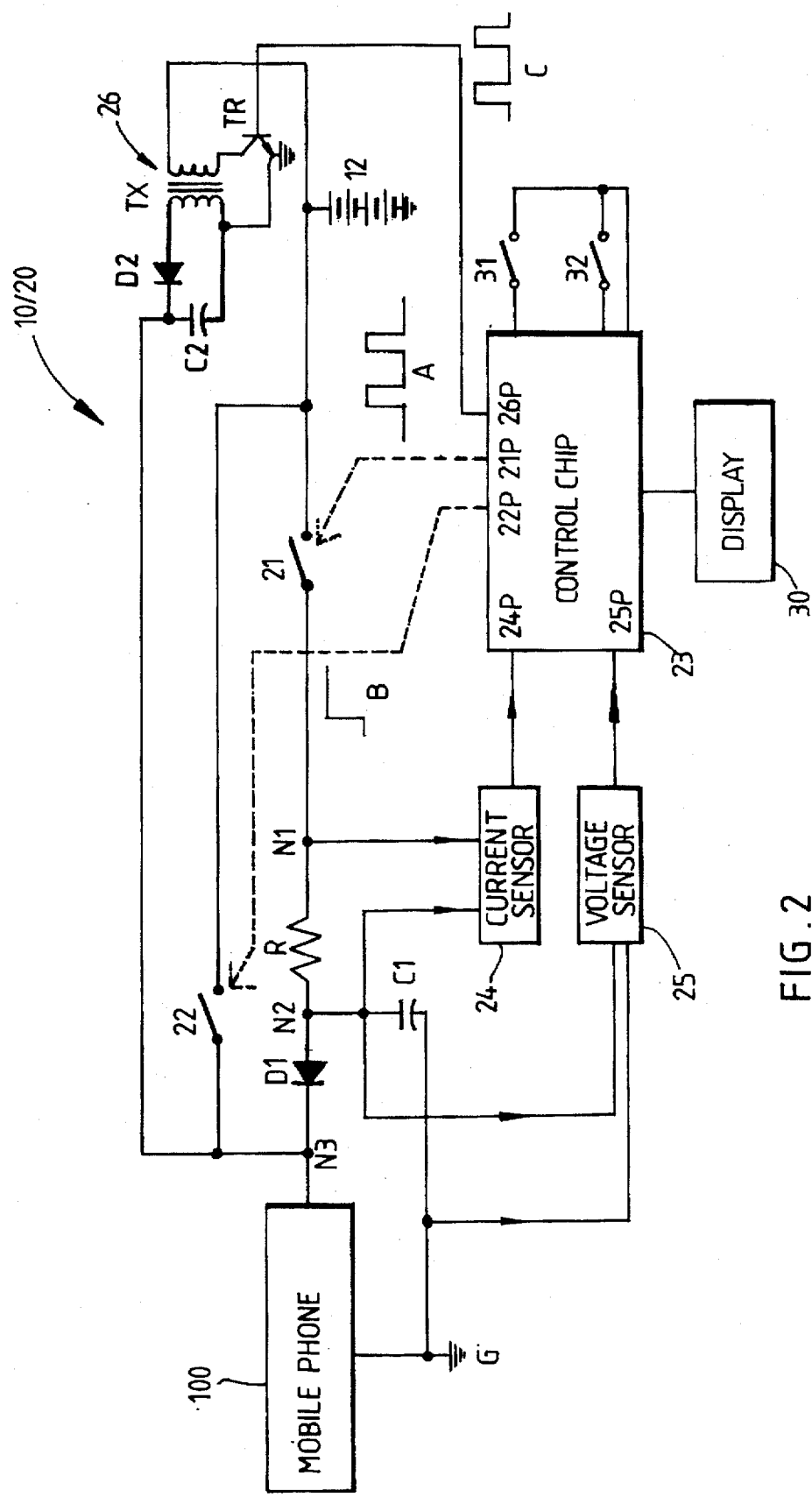
FIG. 2 is a schematic circuit diagram of the battery pack of FIG. 1.

Referring to the drawings, there is shown a rechargeable battery pack 10, embodying the invention, for use on a standard personal mobile phone 100, which battery pack 10 has a body 11 and a series of five rechargeable battery cells 12 and internal operating circuitry 20 both housed within the body 10. The battery pack 10 is designed to releasably fit against the rear side of the mobile phone 100 with respective contact terminals in electrical connection, as generally known in the art. In use, the negative terminals of the mobile phone 100 and the battery cells 12 are connected together at a common ground G.

The operating circuitry 20 has first and second switches 21 and 22 which are provided in respective paths running in parallel with each other for connecting the positive terminal of the battery cells 12 to that of the mobile phone 100. The second switch 22 is connected right across the battery cells 12 and the mobile phone 100. The first switch 21 is connected in series with a resistor R and a diode D1 leading to the mobile phone 100. A first circuit node N1 is formed between the switch 21 and the resistor R. A second circuit node N2 is formed between the resistor R and the diode D1. A capacitor C1 is connected across the circuit node N2 and the ground G. A third circuit node N1 is formed between the diode D1 and the mobile phone 100.

The operating circuitry 20 includes a microprocessor-based control chip 23 and a pair of sensors 24 and 25. The control chip 23 controls the operation of the switches 21 and 22 via respective output pins 21P and 22P. The first sensor 24 is a current sensor which has two inputs connected to the circuit nodes N1 and N2, respectively, and an output connected to an input pin 24P of the control chip 23, for enabling the control chip 23 to monitor the current flowing through the resistor R. The second sensor 25 is a voltage sensor which has two inputs connected to the circuit node N2 and the ground G, respectively, and an output connected to an input pin 25P of the control chip 23, for enabling the control chip 23 to monitor the voltage developed across the terminals of and hence the charging condition of the capacitor C1.

The mobile phone 100 has two normal operating modes, namely standby and busy modes. In the standby mode, the mobile phone 100 communicates periodically with the nearest transmission station for the purpose of, inter alia, identifying its physical location in terms of the communication zone that it is in and looking for a calling signal. The mobile phone 100 requires a current of about 30–50 mA from the battery cells 12 in the standby mode. In the busy mode, the mobile phone 100 transmits and receives speech signals to and from the nearest transmission station for a phone user to talk to a caller. The mobile phone 100 requires a current of about 270–300 mA from the battery cells 12 in the busy mode. In normal use, the mobile phone 100 operates in the standby mode for most of the time and changes into the busy mode when a call is received or made.

The battery cells 12 are connected in series to provide an operating voltage which is normally 6 V and, in a fully charged condition, may reach up to 6.5 V. The mobile phone 100 requires a minimum operating voltage of 4.5 V to 5 V in the standby mode and a relatively higher operating voltage in the busy mode. In the fully charged condition, the battery cells 12 supply excessive power to the mobile phone 100 than what the phone normally requires in the standby mode. This is particularly the case during the initial, for example, four hours of battery operation and results in a waste of battery power.

The first switch 21 is provided for use when the mobile phone 100 operates in the standby mode, whereas the second switch 22 overrides the first switch 21 when the mobile phone 100 operates in the busy mode. The control chip 23 is programmed to continuously provide a square-wave control signal (waveform A) at its pin 21P for periodically turning on and off the first switch 21, said control signal having a frequency of at least 5–10 kHz. The second switch 22 stays normally open and is turned on (closed) by the control chip 23 by means of a stepped control signal (waveform B) provided at the pin 22P only when the mobile phone 100 changes into the busy mode.

In the standby mode of the mobile phone 100, periodical turning on of the first switch 21 enables the battery cells 12 to supply just sufficient power via the resistor R and diode D1 to the mobile phone 100 for operation and excessive power via the resistor R to the capacitor C1 for storage through capacitor charging. Upon periodical turning off of the first switch 21, the battery cells 12 are disconnected and the mobile phone 100 operates via the diode D1 on the power/energy previously stored in the capacitor C1 through capacitor discharging. This is a power saving mode of the operation of the battery pack 10.

The power output from the battery cells 12 gradually reduces through use, resulting in the capacitor C1 requiring a progressively longer charging time or higher charging frequency to store sufficient power for subsequently operating the mobile phone 100. The charging condition of the capacitor C1 is measured by its terminal voltage which is constantly being monitored by the voltage sensor 25. According to the output of the voltage sensor 25 (by means of edge and/or level trigger), the control chip 23 instantaneously adjusts the control signal provided at the pin 21P by way of pulse-width or pulse-frequency modulation in order to maintain the voltage of the capacitor C1 at a predetermined level, such as 5.2 V, slightly above the aforesaid minimum voltage of 4.5 V to 5 V for the mobile phone to operate in the standby mode. For example, when the voltage of the capacitor C1 runs below the predetermined level, the pulse width in terms of duty cycles or the pulse frequency of the control signal at the pin 21P is increased to increase the average closing time or frequency of the first switch 21 and hence the average charging time or frequency of the capacitor C1.

Upon the receipt or making of a call, the mobile phone 100 changes into the busy mode and starts to draw a relatively much larger operating current from the battery cells 12. In the situation that the first switch 21 is closed, the enlarged operating current initially flows through the first switch 21 and is immediately picked up by the resistor R and hence detected by the current sensor 24. In the alternative situation that the first switch 21 is open, the enlarged operating current is initially drawn from the capacitor C1, causing the voltage of the capacitor C1 to drop rapidly which is immediately detected by the voltage sensor 25. In either situation, in response to the edge and/or level trigger by the sensor 24/25, the control chip 23 turns on the second switch 22 to connect the battery cells 12 directly to the mobile phone 100 for the proper supply of the enlarged operating current. The power saving mode of the operation of the battery pack 10 is therefore suspended.

At this time, the presence of the diode D1, that being a uni-directional element, effectively disconnects the capacitor C1 and the continual periodical turning on and off of the first switch 21 will have no effect.

The mobile phone 100 resumes the standby mode upon termination of the call, at which time the control chip 23 opens the second switch 22 to permit the capacitor C1 to be periodically recharged by the battery cells 12 and discharged to the mobile phone 100 as a reserve power source auxiliary to the battery cells 12 in the power saving mode of the battery pack 10.

The operating circuitry 20 further includes a power-up circuit 26; for operation in a power-up mode, which is controlled by means of an output pin 26P of the control chip 23. The power-up circuit 26 is formed by an NPN transistor TR, a step-up transformer TX, a diode D2 and a capacitor C2. The transistor TR has a base connected to the pin 26 and an emitter connected to the ground G. The transformer TX has a primary winding which is connected across a collector of the transistor TR and the positive terminal of the battery cells 12 and a secondary winding which is connected across the ground and an anode of the diode D2. The capacitor C2 is connected across a cathode of the diode D2 and the other end of the secondary winding of the transformer TX. The terminal of the capacitor C2 at the cathode of the diode D2 is connected to the mobile phone 100 at the circuit node N3.

In the power-up mode, the control chip 23 switches the transistor TR on and off at a high frequency by means of a square-wave control signal (waveform C) at its pin 26P, thereby applying the terminal voltage of the battery cells 12 repeatedly across the primary winding of the transformer TX, extracting power from the battery cells 12. A stepped-up voltage is therefore developed across the secondary winding of the transformer TR, which is being applied via the diode D2 to the capacitor C2. The capacitor C2 serves to smooth the stepped-up voltage and supply the mobile phone 100 with a DC voltage which is relatively higher than that originally supplied by the battery cells 12.

The power pack 10 includes an LCD or LED display 30 and two press-switches 31 and 32 provided on the body 11. The display 30 is controlled by the control chip 23 to indicate, inter alia, the power saving mode or the power-up mode and to monitor and display, preferably in the form of a bar/linear display, the terminal voltage/power level of the battery cells 12. The first press-switch 31 is used to select various operating modes of the power pack 10, including the said power saving and power-up modes, a quick charge mode and a discharge mode. The second press-switch 32 is used to alter the settings of a selected operating mode.

In areas where the telephone signal is weak and/or when the battery pack 10 is in a low power condition, it may be advisable to turn off the power saving mode such that the battery cells 12 are always in electrical connection to the mobile phone 100. When the power saving mode is turned off, the control chip 23 opens the first switch 21 and closes the second switch 22 continuously. In the situation where the telephone signal is very weak and/or the battery pack 10 is in a very lower power condition, the power-up mode may be turned on for an urgent telephone call to be made or answered.

The control chip 23 may be programmed to have the power saving mode at different said predetermined levels for operating the mobile phone 100 in the standby mode, such as 5.2 V, 5.4 V and so on which are user selectable by means of the press-switch 31 and/or 32 according to the telephone signal strength of the specific area that the mobile phone 100 is in.

It is appreciated that the capacitor C1 may be replaced by a rechargeable battery cell for storing the said excessive power/energy for use later in the cycle. Also, the switches 21 and 22 may be provided by, for example, solid-state switches or mechanical switches such as relays.

The invention has been given by way of example only, and various modifications of and/or alterations to the described embodiment may be made by persons skilled in the art without departing from the scope of the invention as specified in the appended claims.

What is claimed is:

1. A battery pack for a mobile phone, which battery pack comprises a body, a plurality of rechargeable battery cells and an energy storage device provided within the body for electrical connection to said mobile phone, a switch connecting the energy storage device to the battery cells, a microprocessor-based controller for operating the switch in a first state to enable charging of the energy storage device by the battery cells and in a second state to enable discharging of the energy storage device to power said mobile phone, and a sensor provided for the controller to monitor the charging condition of the energy storage device and, in response, to maintain the charging condition of the energy storage device by operating the switch relatively longer or more frequently in the first state than in the second state.

2. A battery pack as claimed in claim 1, wherein the switch is closed in the first state and open in the second state.

3. A battery pack as claimed in claim 1, wherein the controller is adapted to operate the switch alternately between the first and second states.

4. A battery pack as claimed in claim 1, wherein the switch in the second state is arranged to disconnect the battery cells from said mobile phone.

5. A battery pack as claimed in claim 1, wherein the energy storage device is provided by a capacitor.

6. A battery pack as claimed in claim 1, wherein the energy storage device is provided by a rechargeable battery cell.

7. A battery pack as claimed in claim 1, including a voltage step-up device connected to the battery cells for, under the control of the controller, stepping up the voltage of the battery cells supplied to said mobile phone.

8. A battery pack as claimed in claim 7, wherein the voltage step-up device includes a step-up transformer for stepping up the voltage of the battery cells supplied to said mobile phone.

9. A battery pack as claimed in claim 7, wherein the voltage step-up device includes a capacitor for smoothing the stepped-up voltage.

10. A battery pack as claimed in claim 7, wherein the voltage step-up device includes a transistor which is to be switched on and off by the controller to extract power from the battery cells.

11. A battery pack for a mobile phone, which battery pack comprises a body, a plurality of rechargeable battery cells and an energy storage device provided within the body for electrical connection to said mobile phone, a switch connecting the energy storage device to the battery cells, and a microprocessor-based controller for operating the switch in a first state to enable charging of the energy storage device by the battery cells and in a second state to enable discharging of the energy storage device to power said mobile phone, wherein the battery cells are arranged to be connected to said mobile phone by a first path comprising the switch and by a second path comprising a second switch which is also to be operated by the controller, said first path being provided for the battery cells to supply power to the energy storage device and said mobile phone for operation in a standby mode, said second path being provided for the battery cells to supply power to only said mobile phone for operation in a busy mode.

12. A battery pack as claimed in claim 11, wherein the energy storage device is arranged to be connected to said mobile phone via a uni-directional element which forms part of the first path.

* * * * *